United States Patent [19]

Buxbaum et al.

[11] 4,112,063
[45] Sep. 5, 1978

[54] CONTINUOUS PRODUCTION OF IRON OXIDE HYDROXIDE

[75] Inventors: Gunter Buxbaum; Franz Hund, both of Krefeld, Fed. Rep. of Germany

[73] Assignee: Bayer Aktiengesellschaft, Leverkusen, Fed. Rep. of Germany

[21] Appl. No.: 747,265

[22] Filed: Dec. 3, 1976

[30] Foreign Application Priority Data

Dec. 15, 1975 [DE] Fed. Rep. of Germany ....... 2556406

[51] Int. Cl.² ............................................. C01G 49/02
[52] U.S. Cl. .................................................... 423/633
[58] Field of Search ................ 423/633, 634, 140, 142

[56] References Cited

U.S. PATENT DOCUMENTS

| 3,927,173 | 12/1975 | Melzer | 423/DIG. 2 |
| 3,931,025 | 1/1976 | Woditsch et al. | 423/634 |
| 3,974,267 | 8/1976 | Urban, Jr. | 423/633 |

*Primary Examiner*—O. R. Vertiz
*Assistant Examiner*—Wayne A. Langel
*Attorney, Agent, or Firm*—Burgess, Dinklage & Sprung

[57] ABSTRACT

In the production of an FeOOH seed suspension, comprising contacting an iron(II) salt solution with a basic precipitant to form a basic iron(II) salt or hydroxide suspension, oxidizing the salt or hydroxide, the precipitation and oxidation steps being carried out locally separate from one another and recovering a suspension of FeOOH, the improvement which comprises (a) effecting the precipitation by mixing an about 1 to 20% by weight iron(II) salt solution with sufficient basic precipitant to precipitate about 25 to 95 atom % of the iron(II),
(b) at another location oxidizing 10 to 50% of the iron(II) precipitated in (a) over a period of from about 0.5 to 5 hours at a temperature in the range from about 20° C to 65° C,
(c) at another location oxidizing the suspension obtained in (b) with intensive mixing over a period of from about 0.01 to 1 hour to oxidize at least about 10% more iron until up to at most about 60% of the iron(II) precipitated in stage (a) is oxidized, and
(d) at another location substantially completely oxidizing the precipitated iron(II) still present over a period of from about 1 to 10 hours.

Advantageously the temperature rises progressively from stage to stage. Immediately prior to stage (c) the suspension may be ripened for at least 30 minutes and, immediately after stage (c) it may be ripened for 30 minutes to 5 hours.

6 Claims, 1 Drawing Figure

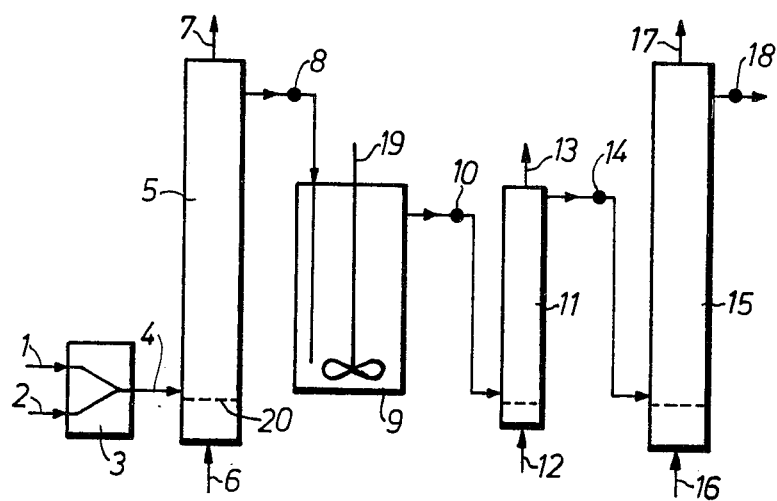

CONTINUOUS PRODUCTION OF IRON OXIDE HYDROXIDE

The oxidation of basic iron (II) salt or iron (II) hydroxide suspensions, obtained by precipitation from iron (II) salt solutions with basic reagents, under different reaction conditions gives different modifications of iron oxide hydroxide (FeOOH), magnetite ($Fe_3O_4$) or even hematite ($\alpha$-$Fe_2O_3$). Most conventional processes for the production of FeOOH start from an iron salt solution which is neutralized either partially or in excess and, in cases where an iron (II) salt solution was used as the starting material, is oxidized. $\alpha$-, $\beta$-, $\gamma$- or $\delta$-FeOOH is formed according to the particular reaction conditions selected.

If, for example, the production of $\alpha$-FeOOH, commercially the most important FeOOH modification, is carried out by the process according to U.S. Pat. No. 3,931,025 some of the iron (II) ions present in an iron (II) sulfate solution are precipitated with alkali in the form of basic salt and oxidized with air. The $\alpha$-FeOOH suspension thus obtained is used as a seed suspension and pigment formation is subsequently obtained by the introduction of more liquor and air. More FeOOH may optionally be grown by the introduction of iron (II) salt solution. The $\alpha$-FeOOH pigments thus produced may either be used as such or may be converted into magnetic $\gamma$-$Fe_2O_3$.

The problem of continuously carrying out precipitation crystallization with formation of one or more intermediate stages, as is the case in the formation of FeOOH, has never been satisfactorily solved because back-mixing and uncontrolled seed formation cannot be avoided. Accordingly the object of the present invention is to develop a continuous process for the production of FeOOH in which there is virtually no undesirable back-mixing and uncontrolled seed formation.

Accordingly, the present invention provides a process for the continuous production of FeOOH seed suspensions by the oxidation of basic iron (II) salt or iron (II) hydroxide suspensions obtained by precipitation from iron (II) salt solutions with basic precipitants, temperatures in the range from about 10° to 95° C. being applied and the precipitation and oxidation steps being carried out locally separate from one another, characterized by the fact that the following process steps are carried out successively in locally and chronologically separate steps:

(a) precipitating basic iron (II) salt or iron (II) hydroxide by mixing an about 1 to 20% by weight iron (II) salt solution with a basic precipitant, about 25 to 95 atom % of the iron (II) being precipitated;

(b) oxidizing about 10 to 50% and preferably about 20 to 40% of the iron (II) precipitated in step (a) over a period of from about 0.5 to 5 hours, preferably over a period of about 1 to 2 hours, at temperatures in the range from about 20° C. to 65° C.;

(c) oxidizing the suspension obtained in step (b) with intensive mixing with the oxidizing agent over a period of about 0.01 to 1 hour, preferably over a period of 0.1 to 1 hour, up to at most about 60% of iron (III), based on iron (II), precipitated in stage (a) being oxidized; and (d) substantially completely oxidizing the precipitated iron (II) still present over a period of from about 1 to 10 hours. Iron (II) salts and alkaline precipitants suitable for use in the process according to the invention are the usual compounds already known from the batch production of FeOOH. Iron (II) sulfate and iron (II) chloride are mentioned as examples of iron (II) salts.

Suitable alkaline precipitants are alkali hydroxides, preferably sodium hydroxide and potassium hydroxide, alkaline earth metal hydroxides such as $Ca(OH)_2$ for example, also alkali carbonates such as, for example, sodium carbonate and/or ammonia. FeOOH is formed in different phases depending both upon the concentration of the iron (II) salt solution used and upon the alkaline precipitant used. $\delta$-FeOOH is formed from dilute solutions (0.5 to about 5% by weight), $\gamma$-FeOOH is formed in cases where iron chloride is used with ammonia as precipitant and $\alpha$-FeOOH is formed in cases where iron sulfate and sodium hydroxide or soda solution are used.

The oxidation in step (c) advantageously oxidizes iron (II) to the additional extent of at least about 10%.

In one preferred embodiment of the process according to the invention, a ripening step (f) is introduced between steps (b) and (c), in which the suspension prepared in step (b) is "ripened" for at least about 30 minutes and preferably for about 1 to 5 hours.

It is important that, after ripening in step (f), the partially oxidized suspension should not contain any FeOOH crystals detectable by electron microscope. For this reason, oxidation in accordance with step (b) of the process according to the invention should be carried out under extremely mild conditions. Oxidation under mild conditions may be carried out for example in a stirrer-equipped vessel ("gassing" stirrer, peripheral speed about 2 to 20 m/second) or in a bubble column. By contrast, FeOOH crystals can be detected by elektron mircoscope at the end of step (c). In another embodiment, another ripening step (g) with residence times of about 0.5 to 5 hours, preferably about 0.5 to 2 hours, is provided between steps (c) and (d).

In the application of the process according to the invention, it is advantageous to allow the reaction temperature to rise from step to step, ambient temperature being preferred for step (a) and a temperature of from about 40° C. to 80° C. being particularly favorable for step (d).

Following the removal of water, the seed suspensions produced in accordance with the invention may be used for the production of particularly transparent $Fe_2O_3$ pigments or may be converted by known methods, for example by the process described in U.S. Pat. No. 3,931,025, into particles of standard pigment size (about 0.1 to 5$\mu$).

Air and oxygen are mainly used as the oxidizing agents, although it is also possible to use, for example, chlorates, iodates, nitrates, persulfates and other soluble oxidants, alkali and alkaline earth metal cations being suitable cations.

In one special embodiment of the process for producing $\alpha$-FeOOH seeds, air optionally enriched with oxygen is used as the oxidizing agent.

Iron (II) sulfate with a concentration of from about 50 to 200 g/l is used as the iron salt solution, while sodium hydroxide with a concentration of approximately 40 to 400 g/l is used for precipitation. The degree of precipitation (i.e. 2 moles of NaOH for 1 mole of $FeSO_4$ corresponds to 100%) should amount to between about 30% and 70%.

Additives, for example, polyvalent metal ions, for example Mn, Ni, Co, Zn, Ca, Cu, Al, Ti, V and Cr, and anions, for example, phosphate, which have proved to be effective in the production of α-FeOOH may be introduced in the usual quantities. Additions such as these are described for example, in U.S. Pat. No. 3,931,025, the disclosure of which is incorporated herein by reference.

One particular embodiment of the process according to the invention is described hereinbelow with reference to the accompanying drawing which is a flow sheet of the process and in which the reference numerals used have the following meaning:

1. feedpipe for iron (II) salt solution
2. feedpipe for alkaline precipitant
3. mixer
4. feedpipe for the mixture
5. oxidation reactor
6. feedpipe for oxidizing gas
7. exhaust gas pipe
8. pH-measuring stage and sampling stage
9. ripening reactor
10. pH-measuring stage and sampling stage
11. oxidation reactor
12. feedpipe for oxidizing gas
13. exhaust gas pipe
14. pH-measuring stage and sampling stage
15. oxidation reactor
16. feedpipe for oxidizing gas
17. exhaust gas pipe
18. outlet and pH-measuring stage
19. stirrer
20. perforated plate An iron salt solution and a base, introduced through feedpipes 1 and 2, respectively, are reacted in the required ratio in a mixer 3, for example, in the form of a pipe section with chicanes, a static mixer or a stirrer-equipped vessel. The resulting suspension flows from the mixer 3 through feedpipe 4 into the reactor 5, for example in the form of a bubble column (H. Koelbel, Dechema Monographien 68 (1970) pages 35/73 and A. Hackl, ibid. 73 (1973), pages 37 to 49), through which the oxidizing agent, preferably gases containing air or oxygen, flows from below (6) through a perforated plate 20. Partial oxidation of the basic iron (II) salts or of the iron (II) hydroxide in accordance with step (b) of the process according to the invention takes place in the reactor 5. At the outlet end 8 of the reactor 5, the degree of oxidation, expressed by the proportion of iron (III) in the total iron content of the suspension, should amount to between about 10 and 30% and preferably to between about 15 and 25%. No FeOOH can be detected at the measuring stage 8 either by use of X-ray photography or by use of an electron microscope. Unabsorbed gases can escape through exhaust pipe 7. In the following reactor 9, for example in the form of a stirrer-equipped vessel or another bubble column, the suspension is ripened for 0.5 to 5 hours preferably for 0.5 to 2 hours (step (f) of the process according to the invention). The residence times are calculated from the volume of the reactor divided by the volume stream of liquid introduced into the reactor 3. Once again no FeOOH crystals can be detected at the measuring stage 10 either by use of a microscope or by use of X-ray photography.

The suspension then enters the reactor 11, for example in the form of a small bubble column, through which large quantities of oxidizing agent are passed (being introduced through feedpipe 12). The residence time of the suspension amounts to between 0.01 and 1 hour and preferably to between 0.1 and 1 hour. Step (c) of the process according to the invention takes place in the reactor 11. Mixers on the lines of a Daniell tap, followed by a tube reactor, may also be used as the reactor 11. At the outlet end 14 of the reactor 11, FeOOH crystals, in the form of acicular to prismatic particles, can be seen in photographs taken with an electron microscope. In the case of substoichiometric precipitation, the suspension has taken on a blue-green color and its pH-value has fallen below about 6 (pH-measurement) carried out with glass electrodes against a calomel reference electrode in the suspension). Finally, complete oxidation in accordance with step (d) of the process according to the invention takes place in the reactor 15 through the introduction of oxidizing agent. The reactor 15 may be for example a bubble column or a stirrer-equipped vessel or, optionally, a cascade of stirrer-equipped vessels. The completed FeOOH seed suspension issues from the outlet 18 of the reactor 15. It may either be worked up as such into extremely finely divided FeOOH or may be processed in known manner to form FeOOH pigments by the precipitation process (DOS Nos. 1,592,398; 1,592,489; 1,958,977 and British Pat. No. 1,297,310), the Penniman process (U.S. Pat. No. 1,327,061 and No. 1,368,748) and/or by the nitrobenzene process (German Pat. Nos. 463,773 and 518,929 and U.S. Pat. No. 1,857,557).

Air and oxygen are mainly used as the oxidizing agents, although it is also possible to use, for example, chlorates, iodates, nitrates, persulfates and other soluble oxidants, alkali and alkaline-earth cations representing suitable cations.

In another particularly advantageous embodiment, the reactors are as follows: the reactor 3 is a pipe combination followed by a mixing zone with chicanes, the reactor 5 is a bubble column, the reactor 9 is a continuous stirrer-equipped vessel, the reactor 11 is a bubble column and the reactor 15 is also a bubble column. The pH-values between the reactors 5 and 9 (measuring stage 8) are in the range from about 5.9 to 7.5; in the range from about 6.5 to 6.9 between the reactors 9 and 11 (measuring stage 10) and in the range from about 5.0 to 5.8 between the reactors 11 and 15 (measuring stage 14). At the outlet end of the reactor 15, the pH value amounts to approximately 4.5 or lower (as measured with glass electrodes against a calomel reference electrode in the suspension).

According to the type and construction of the reactor, the input of oxidizing agent is controlled in such a way that the required degrees of oxidation are reached. Although substantially complete utilization (more that about 90%) of the atmospheric oxygen used as an oxidizing agent can be obtained in the reactor 5, about twice the quantity is favorable, whereas a large excess of air (about 10 fold to 20 fold, based on the FeOOH formed in the reactor 11) has to be used in the reactor 11 and a smaller excess (about 2 fold to about 10 fold) in the reactor 15. The air enters the reactors at 7, 12 and 16. Excess gas leaves the reactors at 7, 13 and 17.

By virtue of the process according to the invention, FeOOH seeds can be continuously produced with a high degree of uniformity and a narrow crystallite size distribution. These seed suspensions may be further grown by continued growth under known, defined conditions into α-FeOOH, β-FeOOH, γ-FeOOH, δ-FeOOH and α-$Fe_2O_3$-pigments, accompanied by an increase in particle size. For producing the ferromagnetic pigments γ-$Fe_2O_3$, $Fe_3O_4$ or mixed phases of $Fe_3O_4$ and $\gamma\text{-}Fe_2O_3$ in phase ranges of about 1 to 99 mole % $\gamma\text{-}Fe_2O_3$, it is possible to use either the FeOOH seed particles themselves or their growth products in known manner by dehydration, reduction and optionally controlled reoxidation (U.S. Pat. No. 2,694,656). Fine metal particles can also be produced from these products by reduction, for example in accordance with DOS No. 2,361,539. The magnetic particles may be used for magnetic pulse recording purposes, for example in tapes, magnetic account cards or similar recording supports.

The process according to the invention is described in the following illustrative example.

EXAMPLE

In the arrangement described as particularly advantageous the reactor 5 is a 7.5 liter capacity bubble column with a diameter of 100 mm, the reactor 9 is a three liter capacity stirrer-equipped vessel, the reactor 11 is a 2.7 liter capacity bubble column with a diameter of 80 mm and the reactor 15 a 12 liter capacity bubble column with a diameter of 100 mm. Each bubble column is provided with a frit plate for gas distribution. The reactors 9, 11 and 15 are externally heated. The air is introduced through needle valves and floats. Iron (II) sulfate solution (220 g of $FeSO_4/1$ and sodium hydroxide solution (90 g of NaOH/1) are pumped into the reactor 5 through the mixer 3 at rates of 3 liters per hour and 1.5 liters per hour, respectively. Air (100 to 220 1/hour) is blown in through feedpipe 6 and controlled in such a way that a pH-value of approximately 6.8 ± 0.3 is maintained at the outlet 8. The temperature is between 20° and ;b 25° C. In the reactor 9, the suspension is heated with stirring (anchor stirrer 60 rpm) to 35° C. in the absence of air. At the measuring stage 10 the pH-value is 6.9 for a degree of oxidation of 35% of the precipitated iron. The suspension is conveyed by a peristaltic pump into the reactor 11 which is warmed to 38° C. and charged with 100 to 500 1/h of air in such a way that a pH-value of 5.8 ± 0.3 is maintained at the measuring stage 14 and the degree of oxidation reaches approximately 55% of the precipitated iron. The suspension is delivered by a peristaltic pump into the reactor 15 which is warmed to 43° C. and charged with 250 to 600 1/h of air so that the pH-value at the measuring stage 13 is below 5. $\alpha\text{-}FeOOH$ seeds with an average diameter of 150 Angstroms are obtained. The analytically determined degree of precipitation is 35% of the total iron.

Pigment formation with an 8 fold increase in the quantity of seed is carried out in conventional manner. By uniformly introducing FeSO-solution, sodium hydroxide and air at a pH-value in the range from 3 to 4 over a period of 8 hours, a pure-colored $\alpha\text{-}FeOOH$ yellow pigment with a desired green-yellow tint is obtained.

It will be appreciated that the instant specification and examples are set forth by way of illustration and not limitation, and that various modifications and changes may be made without departing from the spirit and scope of the present invention.

What is claimed is:

1. In the production of an FeOOH seed suspension, comprising contacting an iron (II) salt solution with a basic precipitant to form a basic iron (II) salt or hydroxide suspension, oxidizing the salt or hydroxide, the precipitation and oxidation steps being carried out locally separate from one another, and recovering a suspension of FeOOH, the improvement which comprises continuously
   (a) effecting the precipitation by mixing an about 1 to 20% by weight iron (II) salt solution with sufficient basic precipitant to precipitate about 25 to 95 atom % of the iron (II),
   (b) at another location oxidizing the suspension obtained in (a) over a period of from about 0.5 to 5 hours at a temperature in the range from about 20° C. to 65° C. and until 10 to 50% of the precipitated iron (II) is oxidized,
   (c) at another location oxidizing the suspension obtained in (b) with intensive mixing over a period of from about 0.01 to 1 hour to oxidize at least about 10% more of the iron (II) beyond step (b) until up to at most about 60% of the iron (II) precipitated in stage (a) is oxidized, and
   (d) at another location substantially completely oxidizing the precipitated iron (II) still present over a period of from about 1 to 10 hours.

2. A process as claimed in claim 1, wherein oxidation is carried out with air or oxygen-enriched air.

3. A process as claimed in claim 1, wherein the suspension obtained in stage (b) is held for at least about 30 minutes between stages (b) and (c).

4. A process as claimed in claim 1, wherein the suspension obtained in stage (c) is held for about 30 minutes to 5 hours stages (c) and (d).

5. A process as claimed in claim 1, wherein the reaction temperature rises from stage to stage and stage (d) is carried out at a temperature in the range from about 40° to 80° C.

6. A process as claimed in claim 5, wherein oxidation is carried out with or oxogyen enriched air, the suspension obtained in stage (b) is held for at least about 30 minutes between stages (b) and (c), and the suspension obtained in stage (c) is held for about 30 minutes to 5 hours between stages (c) and (d).

* * * * *

UNITED STATES PATENT AND TRADEMARK OFFICE
CERTIFICATE OF CORRECTION

PATENT NO. : 4,112,063
DATED : September 5, 1978
INVENTOR(S) : Buxbaum et al

It is certified that error appears in the above-identified patent and that said Letters Patent are hereby corrected as shown below:

| | |
|---|---|
| Col. 1, lines 18,19 | Correct spelling of "commercially". |
| Col. 5, line 33 | Cancel ";b" before "25°". |
| Col. 5, line 45 | Cancel "13" and substitute --18--. |
| Claim 6, line 48 | Correct spelling of "oxygen". |

Signed and Sealed this

Twenty-ninth Day of May 1979

[SEAL]

Attest:

RUTH C. MASON
Attesting Officer

DONALD W. BANNER
Commissioner of Patents and Trademarks